(12) United States Patent
Chen

(10) Patent No.: US 6,697,830 B2
(45) Date of Patent: Feb. 24, 2004

(54) POLYNOMIAL COEFFICIENT GENERATOR

(75) Inventor: Shih-Yung Chen, Taipei (TW)

(73) Assignee: Via Technologies, Inc., Taipei Hsien (TW)

( * ) Notice: Subject to any disclaimer, the term of this patent is extended or adjusted under 35 U.S.C. 154(b) by 596 days.

(21) Appl. No.: 09/740,447

(22) Filed: Dec. 19, 2000

(65) Prior Publication Data

US 2001/0007990 A1 Jul. 12, 2001

(30) Foreign Application Priority Data

Jan. 12, 2000 (TW) ........................... 89100397 A

(51) Int. Cl.$^7$ ................................. G06F 1/02
(52) U.S. Cl. ...................................... 708/270
(58) Field of Search ..................... 708/270, 491–492

(56) References Cited

U.S. PATENT DOCUMENTS

| | | | | | |
|---|---|---|---|---|---|
| 3,978,326 | A | * | 8/1976 | Shimomura | 708/270 |
| 4,845,713 | A | * | 7/1989 | Zook | 714/784 |
| 5,949,695 | A | * | 9/1999 | Snell | 708/270 |
| 6,513,054 | B1 | * | 1/2003 | Carroll | 708/490 |

* cited by examiner

*Primary Examiner*—Tan V. Mai
(74) *Attorney, Agent, or Firm*—J. C. Patents

(57) ABSTRACT

A polynomial coefficient generator for performing a polynomial multiplication. All the sub-coefficients necessary for performing the polynomial multiplication can be sequentially input into the generator. After n clock cycles, all n polynomial coefficients are computed and stored inside the generator ready for use.

9 Claims, 3 Drawing Sheets

FIG. 3

| Circuit | Output \ Pulse Wave | First Clock Pulse ← | → | ↑ | ↑ | Second Clock Pulse ← | → | ↑ | ↑ | Third Clock Pulse ← | → | ↑ | ↑ |
|---|---|---|---|---|---|---|---|---|---|---|---|---|---|
| First Computational Circuit | Multiplication Unit | 0 | 0 | 0 | 0 | $a_1a_2$ | $a_1a_2$ | $a_1a_2$ | $a_1a_2$ | $a_3(a_1+a_2)$ | $a_3(a_1+a_2)$ | $a_3(a_1+a_2)$ | $a_3(a_1+a_2)$ |
| | Control Device | 0 | 0 | 0 | 0 | 0 | $a_1a_2$ | $a_1$ | $a_1a_2$ | $a_2$ | $a_3(a_1+a_2)$ | $a_3(a_1+a_2)$ | $a_3(a_1+a_2)$ |
| | Adder Unit | 0 | 0 | $a_1$ | $a_1$ | $a_1$ | $a_1$ | $a_1$ | $a_1+a_2$ | $a_1+a_2$ | $a_1+a_2$ | $a_1+a_2$ | $a_1+a_2+a_3$ |
| | Storage Unit | 0 | 0 | 0 | 0 | $a_1$ | $a_1$ | $a_1$ | $a_1+a_2$ | $a_1+a_2$ | $a_1+a_2$ | $a_1+a_2$ | $a_1+a_2+a_3$ |
| Second Computational Circuit | Multiplication Unit | 0 | 0 | 0 | 0 | 0 | 0 | 0 | 0 | $a_1a_2a_3$ | $a_1a_2a_3$ | $a_1a_2$ | $a_1a_2$ |
| | Control Device | 0 | 0 | 0 | 0 | 0 | 0 | 0 | 0 | 0 | $a_1a_2a_3$ | $a_1a_2$ | $a_1a_2$ |
| | Adder Unit | 0 | 0 | 0 | 0 | 0 | $a_1a_2$ | 0 | $a_1a_2$ | $a_1a_2$ | $a_1a_2$ | $a_1a_2+a_2a_3+a_1a_3$ | $a_1a_2+a_2a_3+a_1a_3$ |
| | Storage Unit | 0 | 0 | 0 | 0 | 0 | 0 | 0 | $a_1a_2$ | 0 | $a_1a_2$ | $a_1a_2$ | $a_1a_2$ |
| Third Computational Circuit | Multiplication Unit | 0 | 0 | 0 | 0 | 0 | 0 | 0 | 0 | 0 | 0 | 0 | 0 |
| | Control Device | 0 | 0 | 0 | 0 | 0 | 0 | 0 | 0 | 0 | 0 | 0 | 0 |
| | Adder Unit | 0 | 0 | 0 | 0 | 0 | 0 | 0 | 0 | 0 | 0 | 0 | $a_1a_2a_3$ |
| | Storage Unit | 0 | 0 | 0 | 0 | 0 | 0 | 0 | 0 | 0 | 0 | $a_1a_2a_3$ | $a_1a_2a_3$ |

POLYNOMIAL COEFFICIENT GENERATOR

CROSS-REFERENCE TO RELATED APPLICATION

This application claims the priority benefit of Taiwan application Ser. No. 89100397, filed Jan. 12, 2000.

BACKGROUND OF THE INVENTION

1. Field of Invention

The present invention relates to a circuit capable of rapidly generating all the sub-coefficients of a polynomial multiplication. More particularly, the present invention relates to a polynomial coefficient generator.

2. Description of Related Art

In the error correction system of CD/DVD-ROM, polynomial multiplication is often conducted. To carry out polynomial multiplication, a multiplication circuit is needed. For example, if a polynomial function involves the multiplication of n first degree terms such as:

$$F(x)=f_1(x)f_2(2)f_3(x) \ldots f_{n-1}(x)f_n(x);$$

$$=(1-a_1x)(1-a_2x)(1-a_3x) \ldots (1-a_{n-1}x)(1-a_nx);$$

$$=c_nx^n+c_{n-1}x^{n-1}+ \ldots c_2x^2+c_1x+c_0;$$

the operational mode is as follows:

$$F_1(x)=f_1(x)=(1-a_1x);$$

$$F_2(x)=F_1(x)f_2(x)=(1-a_1x)(1-a_2x);$$

$$F_3(x)=F_2(x)f_3(x)=F_2(x)(1-a_3x);$$

$$F_{n-1}(x)=F_{n-2}(x)f_{n-1}(x)=F_{n-2}(x)(1-a_{n-1}x);$$

$$F_n(x)=F_{n-1}(x)f_n(x)=F_{n-1}(x)(1-a_nx).$$

FIG. 1 is a block diagram showing a conventional polynomial coefficient generator. In the polynomial coefficient generator, a polynomial multiplication unit 4 is constructed for processing polynomial multiplication. Using n=16 as an example, because the constant that results from a polynomial multiplication is always 1 (i.e. $c_0$=1), the storage device 6 of the circuit has 16 storage units. Each storage unit is used for holding a coefficient ($c_1$~$c_{16}$). Initially, zero is stored in all storage units.

To execute the calculation $F_1(x)=f_1(x)=(1-a_1x)$, the first polynomial sub-coefficient $a_1$ is stored in the storage unit $c_1$ while zero is still stored in the rest of the storage units $c_2$~$c_{16}$.

To execute the next calculation $F_2(x)=F_1(x)f_2(x)=(1-a_1x)(1-a_2x)$, the second polynomial sub-coefficient $a_2$ is carried into the polynomial multiplication unit 4 and values stored inside the storage units of the storage device 6 are fed back to the polynomial multiplication unit 4. After a computation inside the polynomial unit 4, values of the coefficients $c_1=(a_1+a_2)$, $c_2=a_1a_2$ are obtained and $c_3$~$c_{16}$ are still zero Finally, values of the coefficients are transferred to the storage unit 6.

Similarly, other polynomial sub-coefficients are sequentially input into the polynomial multiplication unit 4, and values of coefficients stored in the storage unit 6 are fed back to the polynomial multiplication unit 4 each time for following calculation. The computed values of the coefficients are stored into the storage units $c_1$~$c_{16}$ of the storage device 6 at the end of each calculation. Hence, all the polynomial coefficients of the polynomial multiplication are obtained after 16 computations.

The complexity of a conventional polynomial multiplication unit is greatly increased if the number of polynomial sub-coefficients is increased. Furthermore, cycles of carrying out each calculation are also increased rapidly with an increase of the number of polynomial sub-coefficient in the multiplication. Hence, a polynomial multiplication unit capable of reducing calculation cycles and circuit complexity is a major design goal.

SUMMARY OF THE INVENTION

Accordingly, one object of the present invention is to provide a polynomial coefficient generator whose input terminal is capable of receiving the polynomial sub-coefficients in a polynomial multiplication sequentially and generating all polynomial coefficients of the polynomial multiplication after necessary cycles.

A second object of this invention is to provide a polynomial coefficient generator capable of performing polynomial multiplication by simple logic circuits.

To achieve these and other advantages and in accordance with the purpose of the invention, as embodied and broadly described herein, the invention provides a polynomial coefficient generator. Polynomial sub-coefficients necessary for a polynomial multiplication are sequentially transferred to the input terminal of an input control device. The sub-coefficients are next transferred from the output terminal of the input control device to a plurality of computational circuits at proper phases of clock cycles. The multiple of computational circuits is also activated by the clock pulses. Each computation circuit is capable of generating a related coefficient. Each computational circuit includes an adder input terminal, a multiplication input terminal and a computational output terminal. The adder input terminal of each computational circuit is coupled to the computational output terminal of the previous computational circuit. The adder input terminal of the first computational circuit and the multiplication input terminals of all the computational circuits are coupled to the output terminal of the input control device. Hence, each computational circuit is able to receive the next coefficient from the input control device through the multiplication input terminal at related phases of clock signals. After the next coefficient is multiplied with its internally stored coefficient, an updated coefficient is output via the computational output terminal. Meanwhile, the adder input terminal of each computational circuit also receives a computed value from the computational output terminal of a previous computational circuit.

In an embodiment of this invention, each computational circuit includes a control device, an adder unit, a multiplication unit and a storage unit. The adder unit adds together the values presented to the first input terminal and the second input terminal and produces a new coefficient to be output from the output terminal of the adder unit. The multiplication unit multiplies together the values presented to the first input terminal and the second input terminal and produces a product to be output from the output terminal of the multiplication unit. The input terminal of the storage unit is coupled to the output terminal of the adder unit for receiving the computed coefficient. The computed coefficient is output from the output terminal of the storage unit. The output terminal of the storage unit is coupled to the second input terminal of the adder unit and the second input terminal of the multiplication unit. The adder input terminal of the computational circuit is the first input terminal of the adder unit. The multiplication input terminal of the computational circuit is the first input terminal of the multiplication unit. The computational output terminal of the computational circuit is the output terminal of the control device. The control device is coupled to the output terminal of the multiplication unit. The value presented to the output terminal of the multiplication unit is output from the output terminal of the control device at proper phases of clock cycles.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 3 shows a timing chart in computing a polynomial multiplication with three polynomial sub-coefficients by three computational circuits.

DESCRIPTION OF THE PREFERRED EMBODIMENT

Figure 1:
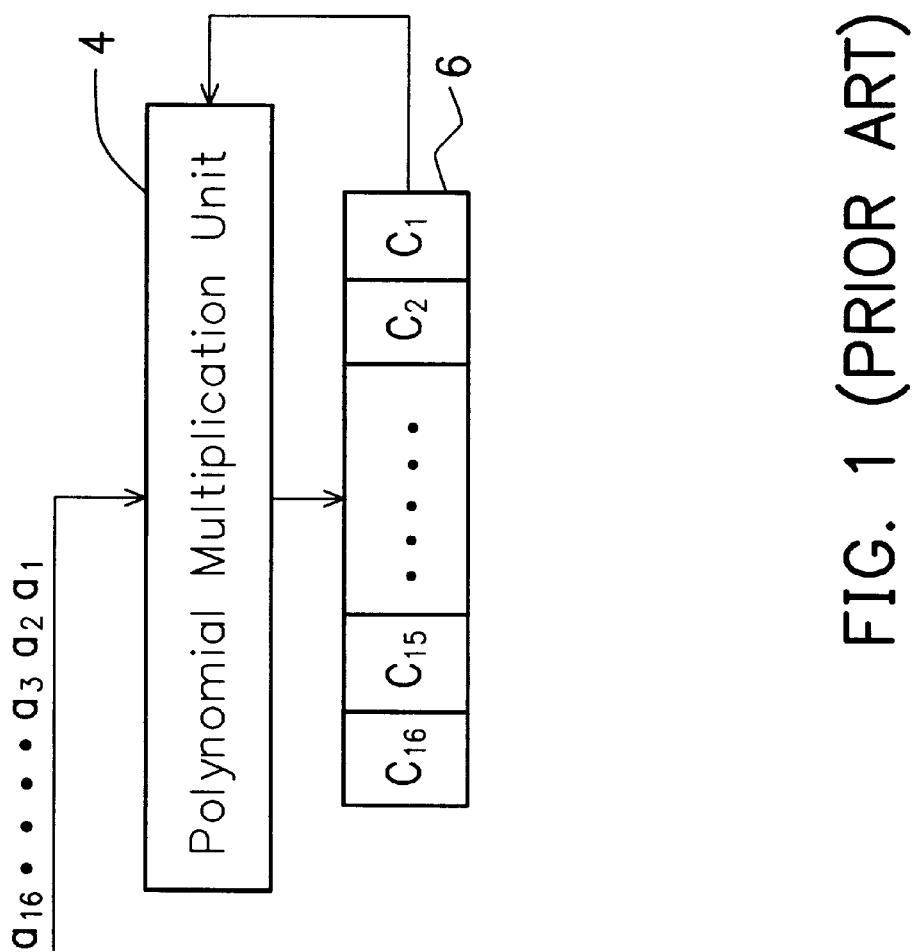
FIG. 1 is a block diagram showing a conventional polynomial coefficient generator.

Reference will now be made in detail to the present preferred embodiment of the invention, examples of which are illustrated in the accompanying drawings. Wherever possible, the same reference numbers are used in the drawings and the description to refer to the same or like parts.

Figure 2:
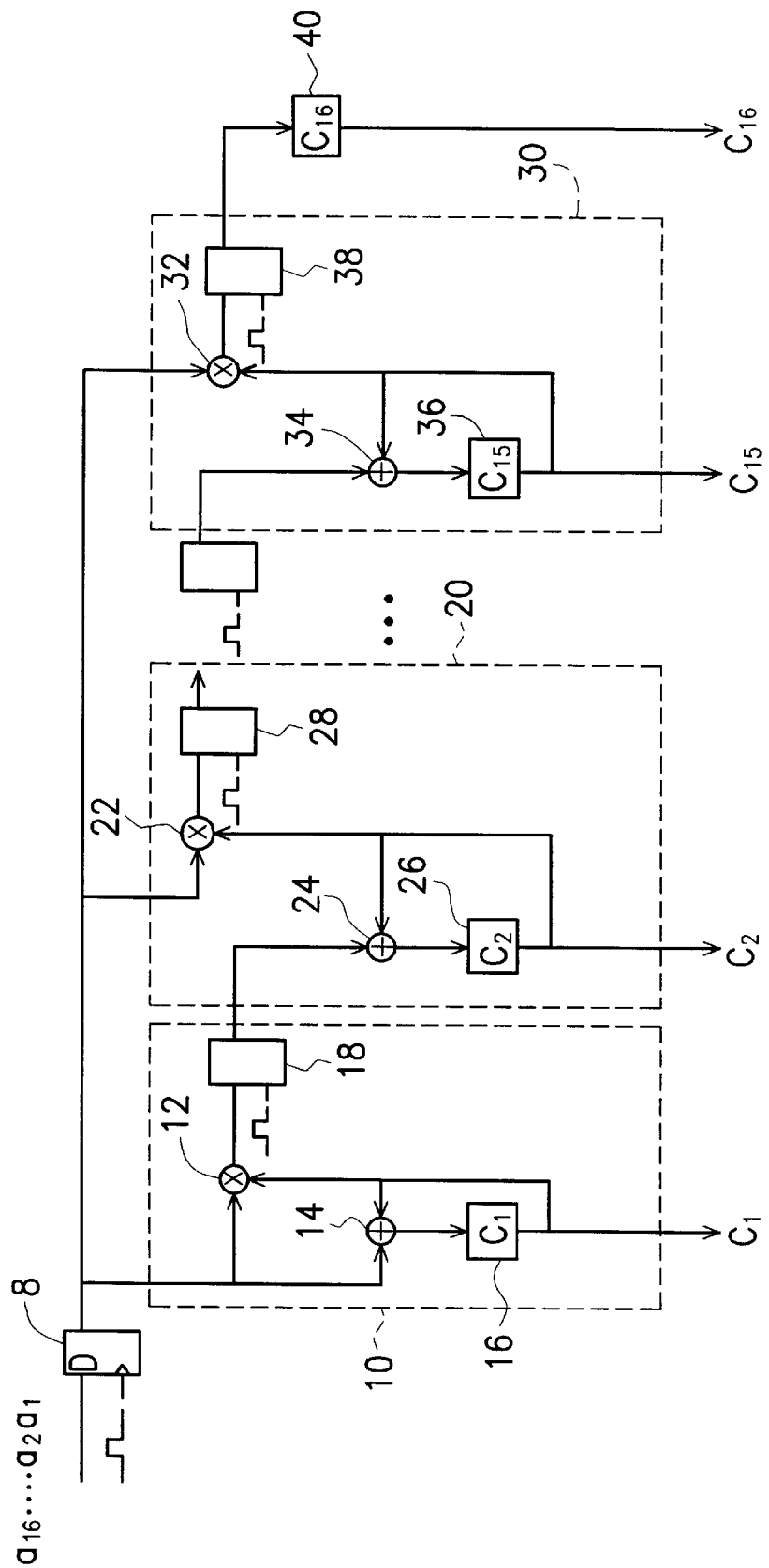
FIG. 2 is a circuit diagram of a polynomial coefficient generator according to an embodiment of the present invention.

FIG. 2 is a circuit diagram of a polynomial coefficient generator according to this invention. As shown in FIG. 2, the polynomial coefficient generator of this invention includes an input control device 8 and a plurality of computational circuits (only three 10, 20 and 30 are shown in FIG. 2). The polynomial sub-coefficients $(a_1 \sim a_n)$ of n first degree sub-polynomials and the polynomial coefficients $(c_1 \sim c_n)$ of the result of the multiplication are defined as follows:

$$(1-a_1x)(1-a_2x)(1-a_3x) \ldots (1-a_{n-1}x)(1-a_nx) = c_nx^n + c_{n-1}x^{n-1} + \ldots c_2x^2 + c_1x + 1$$

The input control device 8 is a D-type flip flop. The necessary sub-coefficients $a_i$ (i=1~n) are sequentially input into the D-type flip flop through the input terminal and then forwarded to the computational circuits 10, 20 and 30 through its output terminal at proper phase of clock cycles. The first polynomial sub-coefficient $a_1$ is input into the D-type flip flop at the 1st clock cycle, and the following polynomial sub-coefficient $a_i$ is input at the ith clock cycle.

The number of computational circuits can be properly extended depending on the number of sub-polynomials in the polynomial multiplication. For example, if the polynomial coefficient generator is used in the multiplication of sixteen sub-polynomials, sixteen computational circuits are used. Using the first computational circuit 10 as an example, the computational circuit 10 contains an adder unit 14, a multiplication unit 12, a storage unit 16 and a control device 18.

The output terminal of the D-type flip flop 8 is coupled to the first input terminal of the multiplication unit 12 and the first input terminal of the adder unit 14. The adder unit 14 adds together the values presented to the first input terminal and the second input terminal and produces a new coefficient to be output from the output terminal. The input terminal of the storage unit 16 is coupled to the output terminal of the adder unit 14 for receiving the computed coefficient. The computed coefficient $C_1$ is output from the output terminal of the storage unit 16. The output terminal of the storage unit 16 is coupled to the second input terminal of the adder unit 14 and the second input terminal of the multiplication unit 12. The multiplication unit 12 multiplies together the values presented to the first input terminal and the second input terminal and produces a product to be output from the output terminal. The input terminal of the control device 18 is coupled to the output terminal of the multiplication unit 12. The value presented to the output terminal of the multiplication unit 12 is output from the output terminal of the control device 18 at proper phases of clock cycles. The output terminal of the control device 18 is coupled to the first input terminal of the adder unit 24 of the second computational circuit 20.

The adder unit 14 adds the inputs thereof to output a coefficient $c_1$ during proper cycles. The value $c_1$ represent the coefficient of one of the terms in a polynomial expression. For example, the value inside the first computational circuit 10 represents the coefficient of the first term in the polynomial expression and so on. In a Galois field, the addition executed by the adder unit 14 is an XOR operation.

The multiplication unit 12 multiplies the inputs thereof to obtain an output during proper cycles. In a Galois field, the multiplication executed by the multiplication unit 12 is an EXOR operation.

The storage unit 16 is connected to the output terminal of the adder unit 14 for storing the output from the adder unit 14, and outputs the stored value via its output terminal. The output terminal of the storage unit 16 is fed back to the adder unit 14 and the multiplication unit 12.

The control device 18 is a D-type flip-flop. The control device 18 receives the output of the multiplication unit 12. The control device 18 outputs at proper phases of clock cycles.

Aside from the connection of one input terminal of the adder unit 14 in the first computational circuit 10 to the output terminal of the input control device 8, one input terminal of each adder unit in other computational circuits is connected to the output terminal of the control device in the previous computational circuit. One of the input terminals of all multiplication units is connected to the output terminal of the input control device 8. The output terminal of the control device in the last computational circuit is connected to a storage device 40 where the coefficient of the highest term in the polynomial expression is stored.

The following is a brief description of the polynomial coefficient generator of this invention. Assume that a 16 sub-polynomial multiplication is required:

$$F(x) = f_1(x)f_2(x)f_3(x) \ldots f_{15}(x)f_{16}(x);$$
$$= (1-a_1x)(1-a_2x)(1-a_3x) \ldots (1-a_{15}x)(1-a_{16}x);$$
$$= c_{16}x^{16} + c_{15}x^{15} + \ldots c_2x^2 + c_1x + 1.$$

Therefore, the sub-coefficients should be transferred to the input control device 8 in the sequential order $a_1, a_2, \ldots, a_{15}, a_{16}$. The input control device 8 sequentially sends out the sub-coefficients at proper phases of clock cycles. Initially, all storage units are set to zero, i.e. $c_{16} \sim c_1$ are 0 initially.

When a first clock pulse is active, $a_1$ is output from the input control device 8 to all multiplication units. Inside the multiplication unit 12, $a_1$ is multiplied with $c_1$ ($a_1 \times c_1 = a_1 \times 0 = 0$), and 0 is obtained. Result of the multiplication is transferred from the multiplication unit 12 to the control device 18 and ultimately output from the computational circuit 10. Meanwhile, $a_1$ and $c_1$ are added together inside the adder unit 14 ($a_1 + c_1 = a_1 + 0 = a_1$). Consequently, other coefficients $c_2 \sim c_{16}$ are still kept at 0 while the storage unit 16 is now holding a new value ($c_1 = a_1$). That is, after the first clock pulse, only $C_1$ is updated.

When a second clock pulse signal is active, $a_2$ is output from the input control device 8 to all multiplication units. Inside the multiplication unit 12 of the first computational circuit 10, $a_2$ and $c_1$ are multiplied ($a_2 \times c_1 = a_2 \times a_1$). Inside the multiplication unit 22 of the second computational circuit 20, $a_2$ and $c_2$ are multiplied ($a_2 \times c_2 = a_2 \times 0 = 0$). Results of the multiplication are transferred from the control devices 18 and 28. Meanwhile, $a_2$ and $c_1$ are added together inside the adder unit 14 of the first computational circuit 10 ($a_2 + c_1 = a_2 + a_1$). The result of the addition ($c_1 = a_2 + a_1$) is stored in the storage unit 16. Similarly, $a_1 \times a_2$ and $c_2$ are added together inside the adder unit 24 of the second computational circuit 20 ($a_1 \times a_2 + c_2 = a_1 \times a_2 + 0 = a_1 \times a_2$). The result of the addition ($c_2 = a_1 \times a_2$) is stored in the storage unit 26. After the second clock pulse, $c_1$ and $c_2$ are updated, and other coefficients $c_3 \sim c_{16}$ are kept unchanged.

After 16 clock pulses, all the coefficients of the terms in the polynomial expression are correctly computed and obtained.

FIG. 3 shows the timing chart in computing a polynomial multiplication with three polynomial sub-coefficients by three computational circuits. In the simulation, the multiplication units inside the computational circuits are rising edge triggered, the control devices are high potential level triggered D-type flip-flops, the adder units are falling edge triggered while the storage devices are low potential level triggered. In FIG. 3, the symbol "↑" represents that the time is at the phase of a rising edge, the symbol "→" in the higher position represents that the time is during the phase of a high potential level, the symbol "↓" represents that the time is at the phase of a falling edge, and the symbol "→" in the lower position represents that the time is during the phase of a low potential level.

In FIG. 3, coefficients of a polynomial expression are obtained after three clock pulse cycles. Values of the coefficients are stored in the storage units inside the computational circuits. In fact, coefficients $c_1$, $c_2$, and $c_3$ are obtained during the phase of a low potential level of the third clock pulse.

In summary, one major advantage of the polynomial coefficient generator is that all the sub-coefficients necessary for performing a polynomial multiplication can be sequentially input, and all n polynomial coefficients are obtained after just n clock cycles. To obtain all n polynomial coefficients by a conventional polynomial multiplication unit needs $(1+n)*n/2$ clock cycles. For example, it requires $(1+16)*16/2=136$ clock cycles for a 16 sub-polynomial multiplication by a conventional polynomial multiplication unit. In contrast, the polynomial coefficient generator of present invention needs only 16 clock cycles to obtain the same result. A second advantage of the polynomial coefficient generator is that only simple logic circuits are employed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A polynomial coefficient generator, in an optical storage device for generating a plurality of output coefficients according to a plurality of input coefficients and a clock signal, comprising:

an input control device capable of sequentially outputting the input coefficients according to the clock signal; and a plurality of computational circuits serially connected in serial stages and activated by the clock signal such that each computation circuit produces and stores a corresponding polynomial coefficient of the output coefficients, wherein each computational circuit comprises an adder input terminal, a multiplication input terminal and a computational output terminal, the adder input terminal of a computational circuit at the first stage, coupled to the output terminal of the input control device, each adder input terminal of the computational circuits at following stages coupled to the computational output terminal of the computational circuit at a previous stage, the multiplication input terminal of each computational circuit coupled to the output terminal of the input control device, and hence, when the input control device outputs the input coefficients according to the clock signal, each computational circuit multiplies the value presented to the multiplication input terminal with the stored corresponding polynomial coefficient of the output coefficients and output the resulting value to the output terminal of the computational circuit, then, each computational circuit adds the value presented to the adder input terminal with the stored corresponding polynomial coefficient of the output coefficients and renews the corresponding polynomial coefficient of the output coefficients by the resulting value.

2. The polynomial coefficient generator of claim 1, wherein the input control device comprises a rising edge triggered D-type flip-flop.

3. The polynomial coefficient generator of claim 1, wherein the computational circuit comprises:

an adder unit having a first input terminal, a second input terminal and an output terminal, wherein the adder unit adds the values presented to the first input terminal and the second input terminal so that a coefficient is generated and then output via the output terminal, and that the first input terminal of the adder unit is the adder input terminal of the computational circuit;

a multiplication unit having a first input terminal, a second input terminal and an output terminal, wherein the multiplication unit multiplies the values presented to the first input terminal and the second input terminal and the resulting product is output via the output terminal, and that the first input terminal of the multiplication unit is the multiplication input terminal of the computational circuit;

a storage unit having an input terminal and an output terminal, wherein the input terminal is coupled to the adder output terminal for inputting the computed coefficient from the adder unit and outputting the corresponding polynomial coefficient of the output coefficients through the output terminal, and the output terminal is coupled to the second input terminal of the adder unit and the second input terminal of the multiplication unit; and a control device having an input terminal and an output terminal, wherein the input terminal is coupled to the output terminal of the multiplication unit so that value presented to the output terminal of the multiplication unit is forwarded to the output terminal according to the clock signal.

4. The polynomial coefficient generator of claim 3, wherein the multiplication unit comprises a rising edge triggered multiplication unit.

5. The polynomial coefficient generator of claim 3, wherein the control device comprises a high potential level triggered D-type flip-flop.

6. The polynomial coefficient generator of claim 3, wherein the adder unit comprises a falling edge triggered adder unit.

7. The polynomial coefficient generator of claim 3, wherein the storage unit comprises a low potential level triggered storage unit.

8. The polynomial coefficient generator of claim 1, further comprising a storage device coupled to the computational output terminal of the last computational circuit in the plurality of computational circuits for storing the highest degree coefficient.

9. A method for generating a plurality of output coefficients according to a plurality of input coefficients and a clock signal, the method used in an optical storage device, comprising the step of:

providing a plurality of computational circuits serially connected and activated by the clock signal such that each computation circuit produces and stores a corresponding polynomial coefficient of the output coefficients, wherein each computational circuit includes an adder input terminal, a multiplication input terminal and a computational output terminal, each adder input terminal of the computational circuits is coupled to the computational output terminal of the previous computational circuit;

outputting the input coefficients to the adder input terminal of the first computational circuit and the multiplication input terminal of each computational circuit sequentially according to the clock signal;

multiplying the value presented to the multiplication input terminal with the stored corresponding polynomial coefficient of the output coefficients and outputting the resulting value to the output terminal of the computational circuit; and adding the value presented to the adder input terminal with the stored corresponding polynomial coefficient of the output coefficients and renewing the corresponding polynomial coefficient of the output coefficients by the resulting value.

* * * * *